(12) United States Patent
Miller (10) Patent No.: US 9,948,772 B2
(45) Date of Patent: Apr. 17, 2018

(54) CONFIGURABLE PHONE WITH INTERACTIVE VOICE RESPONSE ENGINE

(71) Applicant: Larry Miller, Scottsdale, AZ (US)

(72) Inventor: Larry Miller, Scottsdale, AZ (US)

( * ) Notice: Subject to any disclaimer, the term of this patent is extended or adjusted under 35 U.S.C. 154(b) by 0 days.

(21) Appl. No.: 15/390,659

(22) Filed: Dec. 26, 2016

(65) Prior Publication Data

US 2017/0237853 A1   Aug. 17, 2017

Related U.S. Application Data

(63) Continuation of application No. 14/105,011, filed on Dec. 12, 2013, now Pat. No. 9,532,192, which is a continuation of application No. 12/901,366, filed on Oct. 8, 2010, now Pat. No. 8,611,876.

(60) Provisional application No. 61/251,922, filed on Oct. 15, 2009.

(51) Int. Cl.
*H04M 1/00* (2006.01)
*H04M 3/42* (2006.01)
*H04M 1/60* (2006.01)
*H04W 88/02* (2009.01)

(52) U.S. Cl.
CPC ..... *H04M 3/42204* (2013.01); *H04M 1/6041* (2013.01); *H04M 2201/60* (2013.01); *H04M 2203/2011* (2013.01); *H04M 2203/251* (2013.01); *H04M 2250/74* (2013.01); *H04W 88/02* (2013.01)

(58) Field of Classification Search
None
See application file for complete search history.

(56) References Cited

U.S. PATENT DOCUMENTS

| | | | |
|---|---|---|---|
| 6,212,408 B1 * | 4/2001 | Son | H04M 1/271 379/355.01 |
| 6,792,263 B1 * | 9/2004 | Kite | H04M 1/652 455/412.1 |
| 7,333,803 B2 * | 2/2008 | Benco | H04M 3/5322 379/88.14 |
| 2008/0248797 A1 * | 10/2008 | Freeman | H04M 1/72522 455/425 |

* cited by examiner

*Primary Examiner* — Shantell L Heiber (57) ABSTRACT

A land-based or mobile phone and methods are provided for receiving inbound communications as either voice or text, and then based on the user's configuration settings, the inbound communication is provided to the user as it was received or is automatically converted into a format that is desired by the user. The phone also takes voice or text that is input by the user of the phone and converts the user's input to either voice or text based on the configuration settings stored in the user's contact list or otherwise. The outbound communication is configured according to how the intended recipient wants to receive a communication based on the configuration settings stored in the user's contact list or otherwise. The phone includes a controller that determines how the phone will handle and process inbound and outbound communications. The controller includes a speech recognition engine.

1 Claim, 6 Drawing Sheets

CONTACTS LIST — 300

| NAME | TYPE | NUMBER | INBOUND — 301 | OUTBOUND — 302 |
|---|---|---|---|---|
| Default | — | — | V | V |
| Beyonce | Mobile | 123-4141 | T | V |
| Maria | Mobile | 323-4575 | V | T |
| Ashley | Home | 616-2567 | V | T |
| Zia | Office | 551-0125 | V | V |
| Britney | Office | 551-0122 | B | V |
| Twitter | — | @twitter.com | — | T |

303 — Default
304 — Beyonce
305 — Maria
306 — Britney

CONFIGURABLE PHONE WITH INTERACTIVE VOICE RESPONSE ENGINE

CROSS REFERENCE TO RELATED APPLICATIONS

This application is a continuation of U.S. application Ser. No. 14/105,011 filed Dec. 12, 2013, now U.S. Pat. No. 9,532,192, a continuation of U.S. application Ser. No. 12/901,366 filed Oct. 8, 2010, now U.S. Pat. No. 8,611,876, which is a non-provisional of U.S. Provisional Application 61/251,922, filed Oct. 15, 2009, and all of which are herein incorporated by reference in their entirety.

FIELD OF THE INVENTION

The present invention relates generally to the field of land-based and wireless telephonic communications, and more specifically to a phone and methods for configuring the phone so that outbound calls/communications can be initiated in voice or text, and converted to either voice or text and inbound calls/communications can be received in voice or text, and converted to either voice or text.

BACKGROUND OF THE INVENTION

Telephones have been in use for almost one hundred fifty years, but personal telecommunications technology over the last twenty years has improved dramatically with the introduction of a mobile telephone, e.g., the cell phone. Today's mobile phones can receive and transmit voice calls and text messages. Mobile phones can also be used as GPS systems for guidance in navigation and for locating the position of a particular person. Most mobile phones have camera and video functions that can take and store photographs and videos. Further, mobile phones have the capability of accessing the Internet where a user can chat with family and friends, and download games, music, videos, and other desirable information and applications.

Some mobile phones have a very limited capability in a "hands-free" environment. Some mobile phone allow a user to dial a number by speaking the identity or number of a person the user is calling after the user first presses a particular button on the phone to enable or activate this feature. The name or number of person being called is played back to the user so the user can hear and verify the intended recipient, and then the telephone number is dialed and the call placed.

Some in the prior art have sought to allow "hands-free" access to a user's voice mail messaging system. By way of example, without intending to limit the present invention, U.S. Pat. No. 6,868,142, issued on Mar. 15, 2005 to Gupta et al., discloses a voice-operated interface for communicating with a voice mail messaging system. A speech recognition unit is utilized to retrieve certain voice commands (e.g., "next", "skip", "repeat") and then translate the commands into a proper tone sequence which is transmitted to the voice mail messaging system. The voice mail messaging system then retrieves and transmits the voice mail to the user.

For those that are physically challenged, mobile phones have limited use. Those with hearing disabilities are limited to using the mobile phone for receiving and sending text messages and emailing, since they are unable to hear the voice calls or the voice mail messages. Those with visual disabilities, especially the elderly, can use the mobile phone for receiving voice messages but are physically hindered from utilizing, accessing and changing the other features of the mobile phone, including the texting features. They are unable to see the screen or the small messages or in many case the dial pad to use, select and/or change any of the functions on the mobile phone.

Texting while driving has been proven to be more dangerous than driving drunk. Many people have tragically been killed due to a driver who was distracted by texting while driving, and did not see that a traffic light was red or that they had swerved into another lane. Drivers who are texting are also less likely to see a stopped vehicle or other obstacle in their path, since their attention is focused on texting. Some states have outlawed drivers from texting, and the federal government is considering having a national band on texting while driving.

Therefore, what is needed is a method to allow hearing-impaired or sight-impaired or any telephony device user to initiate a communication or receive a communication in a format conducive to the sender's or receiver's need. Examples include a phone that receives a voice call or text communication, and automatically converts the incoming call to a format acceptable or needed by the receiver. What is also needed is a mobile phone that takes voice or text that is input by a mobile phone user and converts the user's input to either voice or text. What also is needed is a method for providing "hands-free" access to the different functions and features of the phone and the ability to change them, including GPS locator services, emergency help calls, camera and videos functions, and music, video and Internet functions.

SUMMARY OF THE INVENTION

Accordingly, the present invention is directed to a mobile or land-based phone and methods through which inbound and outbound telephone calls can be configurable via a voice or hands-free access that substantially obviates one or more of the problems due to limitations and disadvantages of the related art.

An object of the present invention is to provide a mobile or land-based phone and methods for configuring whether inbound calls are output aurally or are visually displayed as text on the phone.

Another object of the present invention is to provide a mobile or land-based phone and method which allow the user to configure the phone to a desired output. Sight-impaired individuals would be able to hear any text message, while hearing-impaired individuals would be able to see any voice communication or message.

Another object of the present invention is to provide a mobile or land-based phone and methods for configuring whether outbound calls are output as a voice signal or a text message or some other format.

Yet another object of the present invention is to provide a mobile phone or land-based phone and methods for using an interactive voice response engine to change any and all functions of the mobile phone using spoken words or commands.

Another object of the present invention is to provide a mobile or land-based phone and methods that enable a voice-activated or hands-free environment where a user can interact with a phone using natural language voice commands. Having such hands-free environment is vitally important in driver safety where drivers should not be distracted on placing or receiving a phone call.

Yet another object of the present invention is to provide a mobile or land-based phone and methods that enable the user to redirect and convert spoken messages and/or text to email, twitter, fax machines, remote computers and printers.

Yet another object of the present invention is to provide a mobile or land-based phone and methods that enable a user to speak voice commands which would perform any function or feature on the phone, including making outbound calls, retrieving desired information stored on the mobile phone, such as pictures, videos, music, and using the GPS navigation features.

The present invention is a mobile or land-based phone and methods that comprise a communications platform for receipt of inbound calls and for placing outbound calls, a controller including an automatic speech recognition engine for converting a voice communication to a text communication, an interactive voice recognition engine for interacting with the user to perform any of the functions or features of the phone, a text to voice engine for converting a text communication to a voice communication, and a chat room engine for displaying text between the user and at least one caller. The controller is also responsible for parsing multiple words into single words and determining whether any of the words match a command or command sequence.

Another feature of the present invention is provide a phone and methods that comprise a receiver that is capable of receiving an inbound voice signal or an inbound text signal, a speaker, a screen, and a controller that is capable of being configured to output the inbound voice signal to the speaker, or to output the inbound text signal to the screen, or to convert the inbound voice signal to text and to output the converted text to the screen, or to convert the inbound text signal to a voice signal and to output the converted voice signal to the speaker.

Yet another feature of the present invention is provide a phone and methods that comprise a transmitter that is capable of transmitting an outbound voice signal or outbound text signal, a microphone that is capable of receiving speech, a keypad that is capable of entering text, and a controller that is further capable of being configured to output the received speech as the outbound voice signal, or to output the entered text as the outbound text signal, or to convert the received speech into the outbound text signal, or to convert the entered text into the outbound voice signal.

Another feature of the present invention is provide a phone and methods that comprise a receiver/transmitter that is capable of receiving an inbound voice signal or an inbound text signal and transmitting an outbound voice signal or an outbound text signal, a microphone, a keypad, a speaker, a screen, and a controller that is capable of being configured to output the inbound voice signal to the speaker, or to output the inbound text signal to the screen, or to convert the inbound voice signal to text and to output the converted text to the screen, or to convert the inbound text signal to a voice signal and to output the converted voice signal to the speaker, and being configured to output speech received by the microphone as the outbound voice signal, or to output text entered on the keypad as the outbound text signal, or to convert the speech into the outbound text signal, or to convert the text into the outbound voice signal.

A further object of the present invention is to provide a phone that is capable of interfacing with a television, a portable computer system and/or desktop computer system either directly or via a docking station.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed and not to limit it.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENT

When used herein, the terms "phone", "telephone", and "telephony device" can refer a wide variety of land-based telephones and/or mobile, wireless telephones. A phone includes a mobile phone that is capable of receiving wireless communications, and includes those traditionally known as a cell phone that wirelessly connect to remotely located base stations. A phone also includes those telephones that are widely used in households, where a telephone is directly connected to a land-line communication system, such as traditional analog, digital, cable, and/or optical phone lines. Additionally, a phone includes a home-based, mobile phone that is wirelessly connected to a base station located in the house, and where the base station is connected to a communications land-line. A phone also includes a satellite phone that is capable of communicating with stationary or moving satellites. A phone further includes those that are handheld or integrated into another device, such as a computer, vehicle, car, motorcycle, ship, bicycle, or truck, for example The phone and methods of the present invention can utilize different communication protocols and systems, including, but not limited to, standard land-based communication technology, Personal Communication Services (PCS) technology, the Global System for Mobile communication (GSM) technology, Time Division Multiple Access (TDMA) technology, Code Division Multiplexed Access (CDMA) technology, Voice over Internet Protocol (VoIP) technology, Internet technology, and any and all other communication systems and protocol technology.

Reference will now be made in detail to the preferred embodiments of the present invention, examples of which are illustrated in the accompanying drawings.

Figure 1:
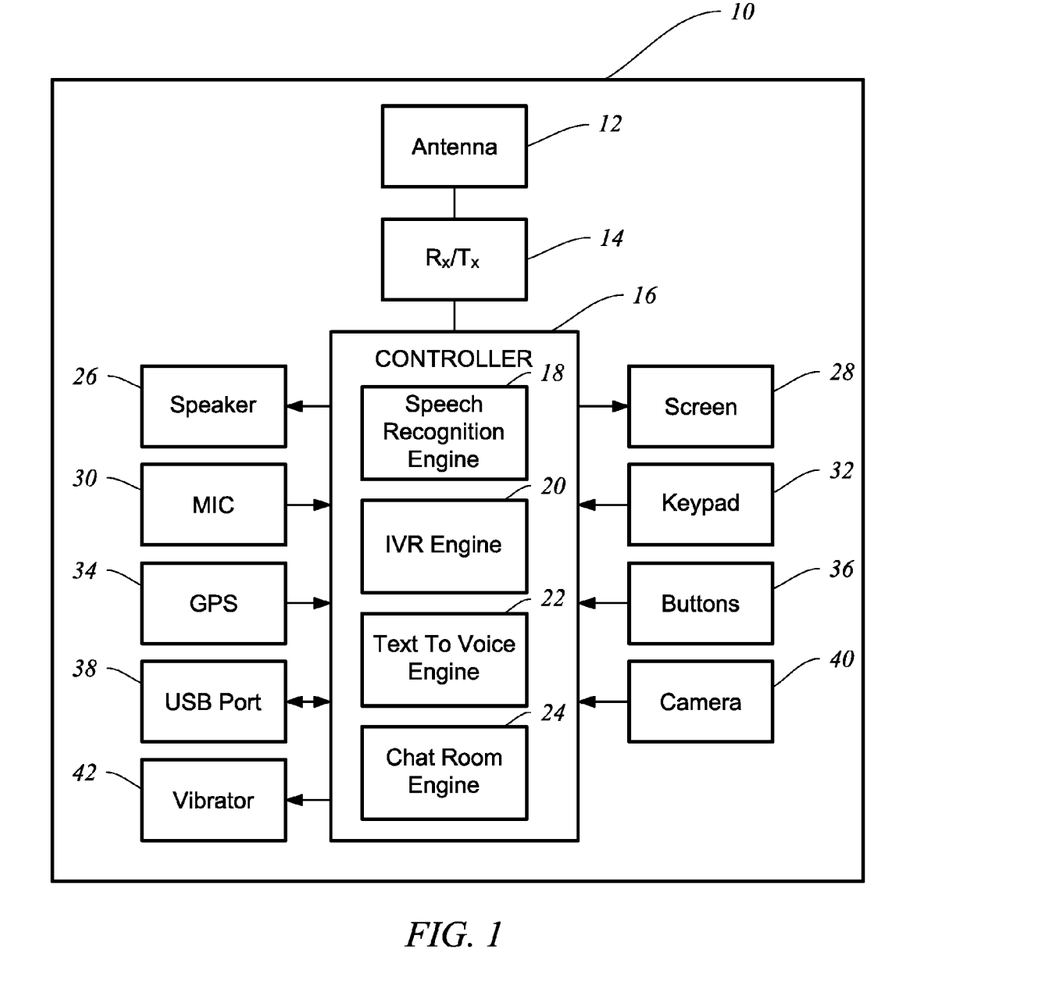
FIG. 1 shows a block diagram illustrating the parts of a phone according to a preferred embodiment of the present invention.

FIG. 1 is a block diagram illustrating the different elements of phone 10 in accordance with a preferred embodiment of the present invention. Antenna 12 is connected to receiver/transmitter ("Rx/Tx") 14 and routes inbound calls (e.g., voice signals and text) to controller 16. Controller 16 also sends outbound calls that were initiated by the user to Rx/Tx 14 where the call is broadcast over antenna 12. Controller 16 is the main processor of phone 10. Controller 16 is not limited to a single processor, but can also comprise two or more processors that are able to communicate with each other. Controller 16 is responsible for programming, processing and handling any and all of the features and functions of phone 10. Controller 16 preferably comprises speech recognition engine ("SRE") 18, interactive voice response engine ("IVRE") 20, text to voice engine ("TVE") 22 and chat room engine ("CRE") 24. Controller 16 also is connected to standard devices associated with phone 10, including speaker 26, screen 28, microphone 30, keypad 32, Global Positioning System 34 ("GPS"), buttons 36, USB port 38, camera 40, and a vibration device 42. These various components comprise all the different varieties of that component which are commercially available now or in the future.

Figure 2:
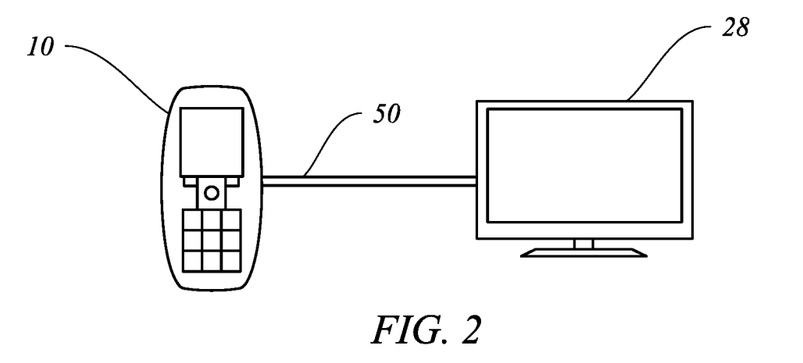
FIG. 2 shows a diagram of a phone that is connected to a screen according to an alternative embodiment of the present invention.

Although the components speaker 26, screen 28, microphone 30, keypad 32, GPS 34, buttons 36, USB port 38, camera 40, and vibration device 42 are preferably included in phone 10, some of the components may be a separate component from phone 10. In an alternative embodiment, phone 10 would plug directly into the separate component. For example, as shown in FIG. 2, phone 10 may plug directly into a remotely located screen 28, such as a computer or television screen via cable 50, for example. Cable 50 could be a USB cable, where cable 50 is connected to USB port 38 of phone 10. In such a configuration as shown in FIG. 2, whatever would be displayed on phone 10, could also be displayed on screen 28. This configuration gives the user the ability to use a voice activated phone 10 with a television screen 28 or a computer screen 28.

Figure 3:
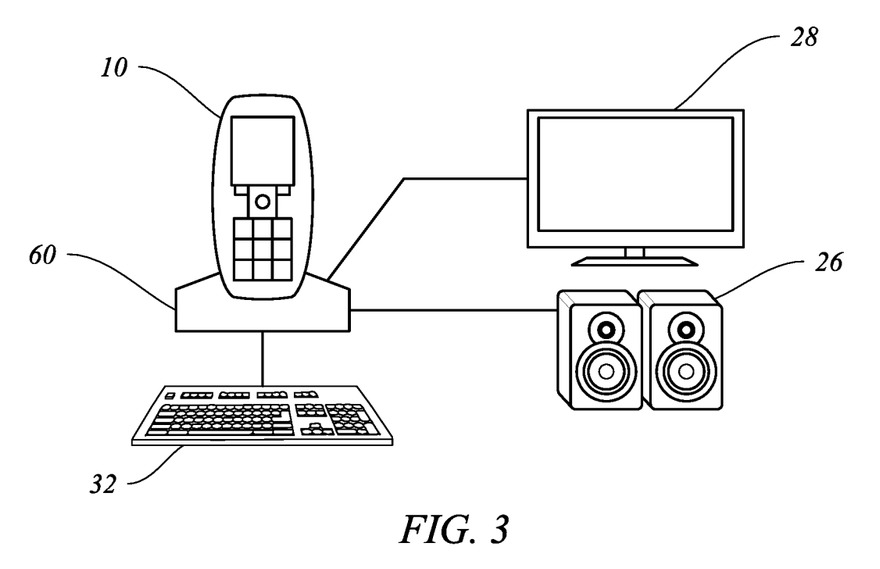
FIG. 3 shows a diagram of a phone that is inserted into a docking station which is connected to a various components according to an alternative embodiment of the present invention.

In another alternative embodiment of the present invention and as shown in FIG. 3, phone 10 can be inserted into docking station 60. When phone 10 is docked in docking station 60, docking station 60 would separate the signals from phone 10 and route each of the signals to the appropriate component, such as speaker 26, screen 28 and keypad 32. Docking station 60 communicates with the various components through a cable or through a wireless connection, such as a wireless keypad that is commercially available, for example. As shown in FIG. 3, the signals from phone 10 that would normally be displayed on phone 10, would be routed through docking station 60 and displayed on screen 28. This configuration allows text that would otherwise be displayed on the phone to be enlarged and displayed on screen 28 for those who are aurally impaired. For those who are visually impaired, voice or text communications could be played on speaker 32.

In yet another embodiment of the present invention, phone 10 may be integrated directly into a laptop, netbook, notebook, desktop, or similar computer system, or may be connected to such a computer system via a USB connection (through USB port 38), or may be connected through a docking station to such a computer system. In these configurations, the user can use the screen, keyboard, speaker and microphone that are normally included in these computer system configurations. As the integration of computer and Internet platforms, entertainment platforms (e.g., television, music, videos) and telephonic platforms continue to advance toward a single, integrated system for home, office and/or vehicular mobile use, the present invention has applicability to such integrated communication systems.

In another alternative embodiment of the present invention, instead of SRE 18, IVRE 20, TVE 22 and CRE 24 being software that is embedded or downloaded to phone 10, these software engines or packages may be remotely located at the servers of the service provider. They are readily accessible to the user of phone 10 through dialing in through a special number, or providing a special function that is initiated when the call is dialed, or otherwise via some other special routine or function. For example, Verizon may offer SRE 18 and IVRE 20 as an added service, but the user must indicate to the service provider that it wants to initiate a translation of the what the user is going to speak. This indication can be spoken, signaled through special keypad combinations, or some other means for communicating with the engines offered by the service provider. In one example, the user may have to dial into a special number (such as used for retrieving voice messages), where the user can then use voice activated commands for initiating and dialing calls. The user would talk into phone 10, the voice signal sent to the service provider, and the service provider would then translate, interpret and perform the spoken command.

In another alternative embodiment of the present invention, some of the engines of SRE 18, IVRE 20, TVE 22 and CRE 24 could be embedded or downloadable to phone 10, while some of the engines may be provided by the service provider or another third party. A special protocol may have to be implemented between phone 10 and the service provider to provide the resulting voice and/or text communication. For example, if the service provider provides SRE 18, the user would speak into phone 10, the words would be transmitted to the service provider. The service provider using its own SRE 18 would translate the spoken words back into text and the text would be transmitted back to phone 10. The translated words could be displayed on phone 10 or utilized by IVRE 20 (which was integrated into phone 10) to initiate and perform any function or feature of phone 10.

SRE 18 has at least two purposes. First, SRE 18 can process what the user of phone 10 is saying and convert the voice signal (i.e., spoken word, words or utterances) into text. The converted or translated text may or may not be associated with a specific command that can be performed and executed by phone 10. After the voice signal has been converted or translated, controller 16 determines whether the user is speaking a command, or whether the user is having a conversation with an inbound or outbound caller. Second, SRE 18 can also process a voice signal from an inbound caller to convert or translate what the inbound caller is saying into text.

Figure 4:
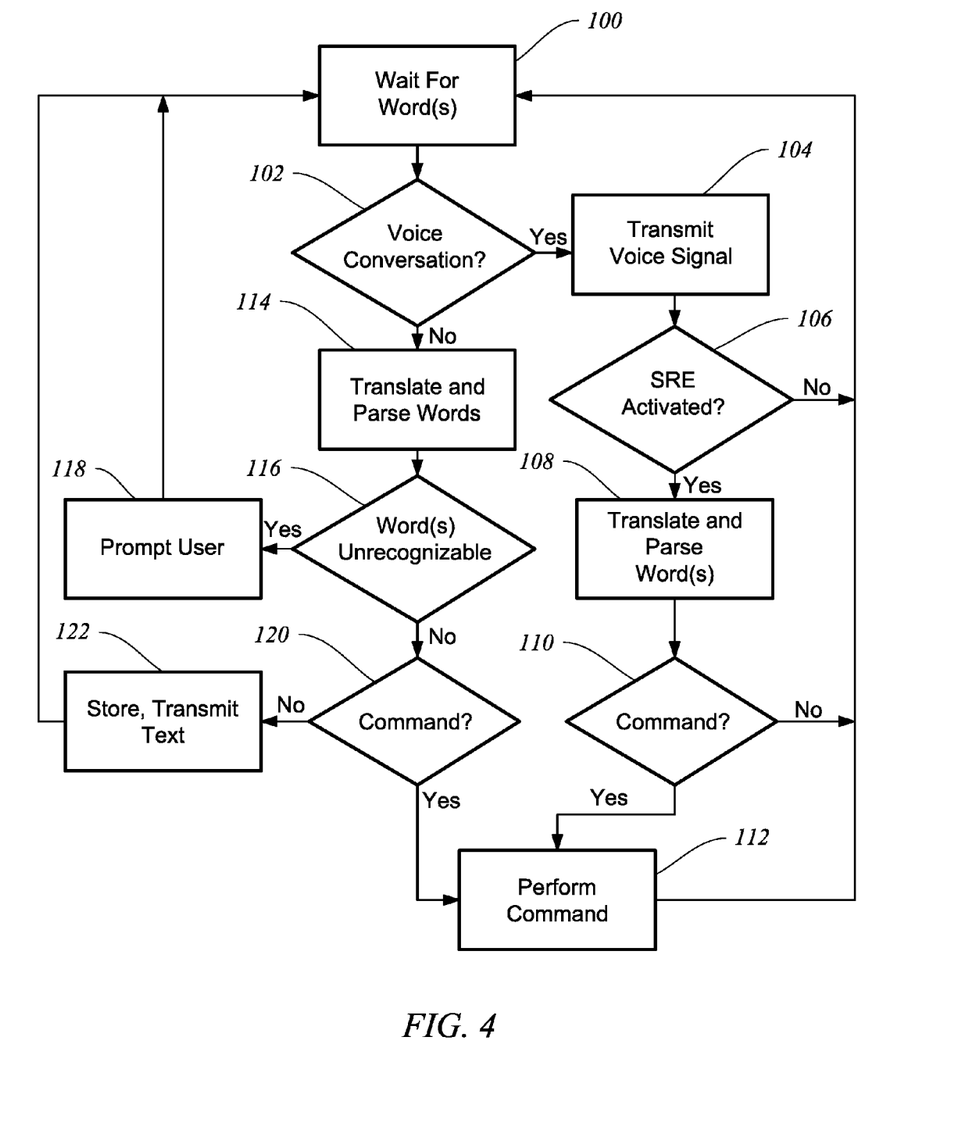
FIG. 4 shows a flowchart illustrating a voice activated, hands-free method according to a preferred embodiment of the present invention.

FIG. 4 shows a flowchart illustrating a voice activated, hands-free method according to a preferred embodiment of the present invention. The method waits in step 100 for the user to speak one or more words. The word or words spoken by the user may or may not include a command to initiate, use, play, program and/or control one of the features or functions of phone 10. After the user speaks one or more words, controller 16 next determines in step 102 whether a voice conversation is occurring. Controller 16 will know whether the conversation is a voice call or text call according to methods discussed later. If controller 16 determines that a voice conversation is occurring, controller 16 transmits the voice signal in step 104 so that there is little to no lag time between when the user talks and when the voice signal is transmitted.

Controller next determines in step 106 whether SRE 18 has been activated. SRE 18 can be controlled by the user and can be either turned off or on. If SRE 18 is off, meaning that the user does not want to use the voice activated command features of phone 10, the method returns to step 100 to wait for more spoken word or words. In an alternative embodiment, step 106 may be performed before step 100. This means that the method shown in FIG. 4 would not be executed if SRE 18 was disabled. The method would wait for SRE 18 to be turned on before waiting in step 100 for the spoken words. Only when SRE 18 was activated, would the method shown in FIG. 4 be performed If SRE 18 is on, meaning that the user wants to use the voice activated command features of phone 10, controller 16 in step 108 uses SRE 18 to translate or convert the spoken word or words into text. Then if multiple words were spoken, controller 16 then parses the words into individual words, and then determines or interprets in step 110 whether a command or command sequence had been spoken. A command sequence is a series of words that comprise a command and the object of the command, e.g., "CALL home". Step 110 also compares the spoken words with those previously trained by the user. If a command or command sequence has not been spoken or the command is unrecognizable, then method returns to step 100 to wait for the user to speak more words. Otherwise, controller 16 in step 112 performs the command and returns to step 100. In this path of steps 104-112, when words are unrecognizable, controller 16 does not prompt the user to repeat these words. Prompting the user in this situation would interrupt the natural voice conversation and cause unnecessary distraction. However, the user in this instance would just need to speak the words again if the user noticed that the desired function or feature had not been performed.

Returning to step 102 of FIG. 4, if controller 16 determines that the user is not having a voice conversation, controller 16 uses SRE 18 in step 114 to translate or convert the spoken word or words to text, and to parse multiple words into single words. Controller 16 then determines in step 116 whether the word or words spoken by the user cannot be understood for some reason. If the words are unrecognizable, SRE 18 provides an indication to controller 16 in step 106 that the words are unintelligible. In an alternative embodiment, controller 16 instead of SRE 18 would be responsible for determining whether a word or words are unrecognizable. Whether controller 16 or SRE 18 determines that the word or words are unrecognizable, controller 16 in step 118 prompts the user to speak the words again and would provide an indication to the user to speak the words again. The indication can include a verbal cue (e.g, "Repeat", "Say again"), a message displayed on the phone, a vibration, or some other cue so that the user would know to repeat what was previously spoken. The user has the option of activating and using IVRE 20. IVRE 20 would provide more interaction between the user and controller 16 to provide some sort of indication for the user to talk slower or would provide some other options that would aid in the translation of the words into text. After prompting the user in step 118, the method returns to step 100 to wait for the user to speak again.

Once the words are recognizable in step 116, controller 16 next determines in step 120 whether the word or words matches one of the commands or is part of a command sequence. For example, if the user first spoke "CALL", then paused and said "home", controller 16 would recognize that the next word after "CALL" is where the call should be placed. In this case, controller 16 would recognize that the user wanted to call home. If the spoken words do not match a command or are not part of a command sequence, then controller 16 stores and/or transmits the translated text in step 122. Otherwise, controller 16 in step 112 performs the spoken command. If multiple options are available that are associated with the spoken command function or feature, the user can speak the additional commands to continue the particular function or feature until its completion, or alternatively, activate IVRE 20 which can guide the user through the various command options.

The following is a partial list of commands and what function each command performs:

"Call"—initiate an outbound call to at least one person/place

"Dial"—initiate an outbound call to at least one person/place

"Conference"—initiate an outbound call two at least two people/places

"Answer"—answer an inbound call

"End"—end the ongoing call

"Text"—initiate an outbound text message to at least one person/place

"Email"—initiate an email message to at least one person/place

"Fax"—fax a message to at least one person/place

"Twitter"—broadcast a twitter message to Twitter recipients

"911"—dial an emergency response team (fire, police, etc.)

"Display"—display an inbound call as text

"Menu"—access the main menu of the mobile phone

"New"—add a new contact to the contacts list

"Message"—create a new message, either voice message and/or text message

"Increase"—increase the sound or volume produced by the mobile phone

"Decrease"—decrease the sound or volume produced by the mobile phone

"Camera"—turn the camera function on/off

"Pictures"—access a list of the user's pictures

"Video"—access a list of videos

"Game"—access a list of games

"Play"—play a previously selected video or game

"Start"—the start of the body of the message to be communicated

"End"—the end of the body of the message to be communicated

"Terminate"—terminate the feature or function currently being performed

"Playback"—play back the body of the message to be communicated

"Send"—send the message to the selected recipient(s)

This list represents only a partial list of the many commands that can be associated with a phone. There are many more commands than those listed above. There also are many variations of these commands including the synonyms of these commands. A user may even personally select their own commands that are associated with a particular function. For example, instead of the user saying "Call" or "Dial", phone 10 may be programmed to perform this function when the word "Communicate" is spoken. When the user wants to change the word that is associated with a particular command, phone 10 would be programmed by the user to associate a selected feature or function with the spoken alternative word. Such programming would be accessible via a menu option or through interaction with IVRE 20.

SRE 18 may be programmed to train and recognize the particular enunciations of how the user speaks a particular command. A database of spoken commands may be stored in controller 16 or locally accessible through a memory device which is connected to controller 16. SRE 18 may also create a database of words spoken by another person who regularly converses with the user of phone 10, or alternatively, may store other information vital to how SRE 18 translates a word that is spoken by someone other than the user. For example, SRE 18 may initially require a new caller to speak a series of select words so that SRE 18 can program itself to understand and more accurately translate the caller's spoken words into text.

In addition to single command words, controller 16 using the method shown in FIG. 4 can recognize and process multiple, separate command words or words that are associated with a command or part of a command sequence. For example, when the user speaks the words "CALL home", controller 16 uses SRE 18 to translate the user's spoken words into text. Although "CALL" is a command word, "home" is not a command word, but the object of where the user wants to call. In this case, controller 16 interprets that the user wants to place a call to the user's home phone number. Controller 16 accesses the user's contacts list, retrieves the "home" phone number, and dials the phone number associated with the "home" entry in the contacts list. After dialing the phone number, controller 16 then establishes the call between the user and home. A user can also speak commands during the phone conversation, which can be executed by controller 16 without the other party being aware of these commands. At the conclusion of the call, the user speaks the word "TERMINATE" to end the call.

In another example, when the words "CONFERENCE Office Maria", phone 10 via controller 16 establishes a conference call with the user's office and Maria. Each of the phone numbers are retrieved from the user's contacts list or some other source. Although the conference call is initiated by the user's phone 10, the conference call is preferably established by the user's service provider since it can make the required switching for a conference call.

Additionally, using controller 16 and SRE 18, a user can build a message which can be sent in a desired format to one or more people or places. For example, a user can speak the following words: "CALL Grandma START Hi Grandma, Hope you are doing well after your hip surgery. I am coming to visit you tomorrow around 10 am. Ciao, Larry END SEND." Based on the configuration of how the message is to be delivered (as explained below), controller 16 identifies whether the user wants to send to Grandma a voice mail, text message, email, fax, or a message in another format. In this example, the words "CALL" and "START" indicate to controller 16 that the user wants to send a voice mail message to Grandma. If the user had spoken "FAX", the message would been faxed to Grandma's facsimile number. If the user had spoken "EMAIL", the message would have been emailed to Grandma's email account.

Controller 16 also recognizes that the word "START" is a command, and builds the body of the message starting with the word "Hi". Controller 16 also recognizes that the word "END" which designates that the body of the message had been completed, which in this case the body of the message ends with "Larry". If a voice message is being communicated, the voice message is digitally stored and not translated. If a text message, fax or email is going to be communicated to Grandma, SRE 18 translates the body of the message into text. Controller 16 then takes the translated message and using the chosen format, delivers (i.e., "SEND") the message to Grandma.

In an alternative embodiment, instead of using a separate command for each form of communication (such as Call, Dial, Fax, Email, etc), a single word may be utilized to initiate a communication with one or more outbound callers. The form of the communication would be individualized for each of the outbound callers based upon the information included in a contact list. This information would indicate to controller 16 whether the outbound caller has indicated a preference for a voice mail message, an email, a Tweet, a fax or some other form of communication. For example, when the user speaks the following words: "MESSAGE steve matt team one START meeting moved to 3 in conference room 10 END SEND." Controller 16 interprets that a message (i.e., "meeting moved to 3 in conference room 10") needs to be sent to Steve, Matt and each of the members of team one. Controller 16 accesses the user's contacts list information and determines that Steve prefers to receive a voice mail message, while Matt prefers to receive a text message and the members of Team all prefer an email. Controller 16 then sends Steve a voice mail message (without translating the voice into text), and also sends to Matt a text message and an email to each of the members of team one by converting the voice into a text communication via SRE 18 and sending the message in the required format. Therefore, by combining a command with information contained in the contacts list (or elsewhere), phone 10 can simplify how communications are relayed by the user to one or more individuals. This way the user does not have to remember how an intended recipient desires to receive a message.

In another alternative embodiment and using the example provided in the previous paragraph, phone 10 may be configured to always send either a voice or text communication when the command word "MESSAGE" is spoken. Controller 16 would not retrieve information from the contacts list since the message will always be sent as a voice or text communication. Suppose a text message would always to be sent when the command word "MESSAGE" is spoken. In this instance, a text message would be sent (as converted by SRE 18) to Steve, Matt and each of the members of team one. After receiving an indication of the text communication at each of their phones, their phones would then identify that a text message is being received from the user. Their phones would then determine how to handle the text message and how to format it according to each of their preference based on their preference in general or based on a particular caller, such as the user in this example. For example, Steve may prefer a voice mail message, so his phone would obtain or receive the text communication and translate the text to a voice communication and format the voice communication into a voice mail message. Matt may prefer a text message so the text message is put into his text queue. Some of the members of team one may want an email message while some members want to receive a text message. For those members of team one preferring a text message, the text message is indicated in their text queue. Otherwise, for those members of team one wanting an email message, each of their phone reformats the text message into an email message. The email message is then sent to the email account of those members wanting an email message. This alternative method allows the user's phone to always send one type of message, which is then converted to the desired format upon receipt by the recipient's phone.

In the preferred embodiment, IVRE 20 is responsible for interacting with the user to access some or all of the functions and features of phone 10. IVRE 20 uses audible words or text to communicate with the user. Whether IVRE 20 communicates audible words or text can be selected and programmable by the user. For example, IVRE 20 could audibly state via speaker 26 "for music 1, messaging 2, contacts 3, recent calls 4, setting and tolls 5, repeat 6, up one level 7". Once the user states or inputs one of the numbers 1-7, IVRE 20 will go to the next level of menu options and state what options are available. The user can speak a message for a text message, an email message, a twitter message or other text message services using for example, "START", (the body of the message), "END". IVRE 20 builds the message in conjunction with SRE 18, and once completed, controller 16 will send the message to the designated parties.

The user can continue interacting with IVRE 20 to get to a specific feature or function the user wants to perform. Some of the features or functions are as follows: entering new contact information and phone numbers, creating text messages, setting and downloading ring tones, activating or disabling SRE 18, IVRE 20 or TVE 22, setting and changing the sound, display, phone and calls settings, accessing, displaying and playing games, pictures or videos, or navigating using GPS 34.

In the preferred embodiment, TVE 22 is a software engine or program that converts a text of one or more words to an audible voice signal that can be played over speaker 26 or communicated via Rx/Tx 14 to another caller. The inputted text to TVE 22 can be received either as an inbound text communication or typed by the user using keypad 32.

In the preferred embodiment, CRE 24 is software program or engine that enables phone 10 to converse in a chat room environment or something similar to a chat room, with family, friends, their business associates, their clients and any other person. IM+ and All-in-One Instant Mobile Messenger are mobile applications they permit mobile users to connect via the Internet to Google Talk, AIM/Chat, MSN or Windows Live Messenger, Yahoo! and Jabber. A high number of mobile phones 10 can connect to the Internet and can use these CRE engines for joining and chatting in public chat rooms. Since these chat rooms are public and lack any privacy, in an alternative embodiment, some service providers are creating private, mobile chat rooms. These mobile chat rooms can be established between two or more individuals and are private as between those individuals. There are a variety of ways for ensuring that only select individual can gain access to a private, mobile chat room. For example, only those with a valid password will be able to gain access to a select, private, mobile chat room.

SRE 18, IVRE 20, TVE 22 and CRE 24 can be either embedded in the software of controller 16, or alternatively, each engine could be a stand-alone application that is downloaded via USB port 38 and executed by controller 16 when needed. There are many speech recognition engines, interactive voice response engines, text to voice engines and chat room engines available either as freeware or as a fee-licensed program. It is anticipated that the service provider of the mobile phone will be responsible for providing, maintaining and updating SRE 18, IVRE 20, TVE 22 and CRE 24 as an added feature of a mobile phone. By the service provider providing and maintaining the software of SRE 18, IVRE 20, TVE 22 and CRE 24, a user would be able to download the latest version of the desired engine from the service provider's website to a mobile phone via USB port 38.

Figure 5:
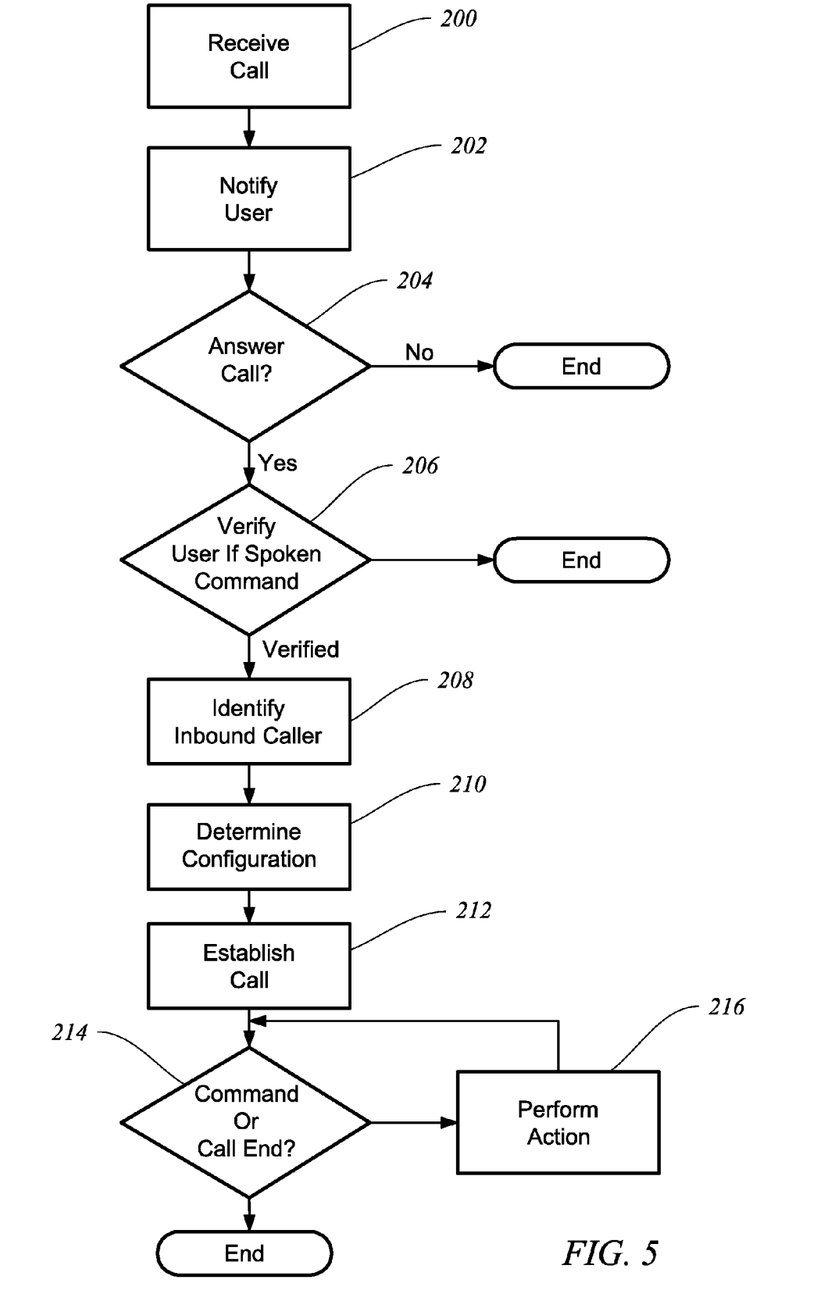
FIG. 5 shows a flowchart illustrating an inbound call method according to a preferred embodiment of the present invention.

FIG. 5 shows a flowchart illustrating an inbound call method according to a preferred embodiment of the present invention. At step 200, when a call or communication is received at antenna 12 of phone 10, the signal is received at receiver/transmitter ("Rx/Tx") 14. The voice or text communication is routed to controller 16 which handles the inbound call. In step 202, controller 16 will notify the user of the inbound communication based on how the user wants to be notified. The user's preferences can include audible ring tones via speaker 26, displays on the screen 28, and/or vibrations via vibration device 42. These inbound call indications can be selected and changed by the user using keypad 32, buttons 36, or speaking commands via microphone 20 and processed by controller 16, SRE 18 and optionally IVRE 20. Within the standard period of time normally used for answering a call, the user then can indicate to controller 16 in step 204 whether the user wants to answer the call by providing an appropriate indication, such as pressing an appropriate number on keypad 24, or pressing one of the other buttons 26 on phone 10, or speaking a predetermined, user-selectable command such as "ANSWER", for example. If the user does not want to answer the call within the allotted period of time, the inbound call method ends. Otherwise, if the user provided the appropriate indication which also included speaking a command, controller 16 next determines in step 206 whether the person who spoke the command is the user associated with phone 10. This verification step is important for prohibiting other people from receiving a call that is meant for the user. Phone 10 may be programmed to answer the call based on the user's voice only, or on the user's voice and other authorized individuals. Controller 16 compares the spoken command word (or words) with that previously associated with the user (or other authorized user), and if there is a match or a high probability of a match, the inbound call is answered and the call is permitted. Otherwise, the inbound call method ends.

Once the verification step has been performed by controller 16, controller 16 next determines in step 208 the identity of the inbound caller. The inbound caller can be identified by the name or phone number associated with the inbound call. Controller 16 then searches the contacts list associated with phone 10 and determines whether there is a match to an entry in the contacts list. If there is no match, the call will be handled by a default setting. If controller 16 is programmed to always handle the inbound communication according to the information in the default setting, step 208 can optionally be eliminated from the method shown in FIG. 5, since the identity of the inbound caller is not needed. However, if controller 16 is programmed to handle the inbound communication according to the information for a particular inbound caller, then based on the identity of the inbound caller, controller 16 next determines in step 210 how phone 10 should be configured. The configuration information details whether the user wants to hear the inbound call over a speaker, or see the inbound call as text displayed on a screen. Based on the user's preference as stored in the contacts list, phone 10 can (1) route the voice communication to speaker 26 where it can be audibly heard, (2) convert a text communication into a voice communication via TVE 22 and route the converted voice communication to speaker 26, (3) route text communication to screen 28 where the text can be visually displayed on screen 28, or (4) convert a voice communication into text via SRE 18 where the translated text can be displayed on screen 28. For text communications, controller 16 can optionally initiate and establish an environment using CRE 24 that is similar to an on-line chat room. This way the user and the inbound caller can communicate to each other using text rather than speech.

Once the configuration of the inbound communication is determined in step 210 by referencing the user's contact list, controller 16 establishes the call session in step 212. The call continues in step 214 until one of the callers hangs up or, if during the call, the user speaks or texts a command that is recognizable by controller 16 to end the call. If the user speaks a command (or command sequence), the action associated with the spoken or texted command(s) is performed by controller 16 in step 216. The spoken or texted command is not relayed to the inbound caller, so the inbound caller is unaware of what the user wants to do. This cycle will continue to repeat each time the user speaks or texts another recognizable command. The method returns to step 214 until one of the callers terminates the call, or the user speaks or texts another command.

For an inbound voice call or communication, controller 16 can either transmit the voice signals to speaker 26, or convert the voice signal (i.e., spoken words) into text via SRE 18 and visually display the text on screen 28. Which way the controller 16 will process the signal and output the results to the user is based on the user's preferences based on the default setting or a setting for each of the individual inbound callers. Since the inbound call is a voice communication, controller 16 will establish the communication session with the inbound caller as a voice communication. This means that all responses from the user to the inbound call will be treated as if they were a voice call, regardless of whether the user is talking into microphone 30 or entering text into keypad 32.

Similarly for an inbound text call or communication, controller 16 can either display the text on screen 28 or convert the text to voice signals via TVE 22, where the resulting voice signals can be heard via speaker 26. Whether the text is displayed or converted into a voice signal is based on the user's preferences as determined by the information contained in the contacts list. Controller 16 could also open an environment similar to a private, mobile chat room using CRE 24, where the user and the inbound caller can use text to communicate to each other in the private chat room. Controller 16 will establish the communication session with the inbound caller as a text call. All responses will take the form of text, regardless of whether the user is talking into microphone 30 or entering text into keypad 32.

One format of a text communication may include FTP or file transfer protocol. For example, FTP is built into MSN Messenger in such a way that a file can be instantly sent to a chat room. A free version of AOL Instant Messenger allows instant messages to be sent that are made to resemble chatting, but instead callers take turns sending the messages. The screen that appears on phone 10 is set up to follow the ongoing conversation.

In response to either an inbound voice call or communication or text call or communication, the user can communicate to the inbound caller by speaking or texting the responses, or a combination of both. Controller 16 can handle both types of input and will create a stream of words based on a timeline of when the user spoke or texted. The format of the response, however, is synchronized with the format of the inbound call. This means that if the inbound call was a voice call, the responses will be a voice signal, whereas if the inbound call was a text call, the responses will be formatted a text signal. For example, if the inbound communication session was a voice call, and if the user wants to speak into microphone 30, controller 16 does not convert the user's spoken words, but instead just sends transmits them to Rx/Tx 14 and antenna 12. However, if the inbound communication session was a voice call, but the user wants to use keypad 32 to text the responses, controller 16 will take the user's text stream, convert it to a voice signal via TVE 22 and transmit the resulting voice signal to Rx/TX 14 and antenna 12. In a different example, if the communication session was established as a text call, and the user wanted to respond by talking, the user's voice signal will be processed by SRE 18, where the spoken words would be converted into text. The resulting text would be transmitted via Rx/Tx 14 and antenna 12.

Figure 6:
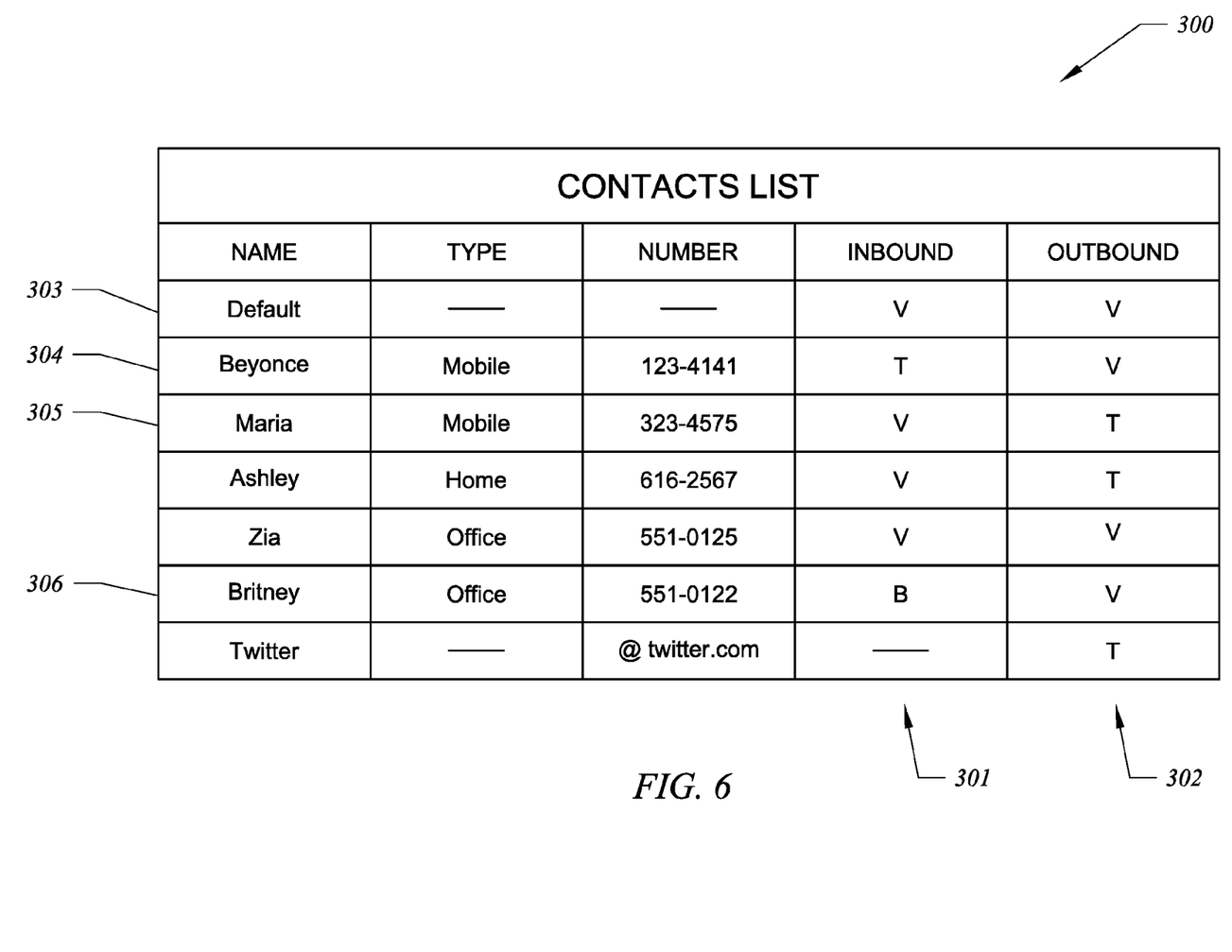
FIG. 6 shows an example of a configuration table.

In step 210 of the method shown in FIG. 5, based on the identification of the inbound caller, controller 12 determines the configuration of phone 10 by referencing the configuration settings contained in a contacts list. A partial view of an example of contacts list 300 is illustrated in FIG. 6. Contacts list 300 includes information or data that is currently available in a contacts list, such as name (e.g., person or place), type (e.g., mobile phone number, home phone number, office phone number, email address, fax number), and an entry to representing the phone number, the email address or twitter address. In addition, contact list 300 includes the ability to designate or program the inbound and outbound configuration settings in general for a default caller (row 303) and for each individual caller which is identified in contacts list 300. Contacts list 300 further distinguishes whether an inbound call is to be processed as voice ("V"), text ("T") or both ("B") (column 301). Similarly, contacts list 300 also details how an outbound call is to be transmitted (column 302), whether as a voice call ("V") or as text ("T").

The inbound and outbound configuration settings in contacts list 300 can be programmed or set by the user. The user has the ability to change the settings either by accessing the menu functions either via keypad 32 and buttons 36 or via spoken words via SRE 18. IVRE 20 can optionally be initiated to program the inbound and outbound configuration settings.

Contacts list 300 specifies how to handle inbound calls and outbound calls for a default caller (row 303). A default caller is an inbound caller that is not included in user's contacts list 300 of phone 10. In this case, all inbound calls, whether it be a voice communication or text communication, are to be configured or processed as an audible voice signal that can be heard over speaker 26. This means that if the received signal is a voice signal, then controller 16 will automatically route the voice signal to speaker 26 without performing any conversion. However, if the received signal is a text communication, then controller 16 automatically utilizes TVE 22 to convert the received text to a voice signal. Controller 16 will then send the resulting voice signal to speaker 26.

When the identity of the caller is not specified by the user for an outbound caller, but the phone number is entered manually using keypad 32 or the phone number is spoken by the user, controller 16 configures the outbound communication as a standard voice communication based on the outbound default setting. If the user is speaking, a voice communication is automatically transmitted without any conversion by controller 16. If the user is texting, controller 16 using TVE 22 automatically converts the text to a voice communication and transmits the voice signal to the person being called.

In the second example, row 304 of contacts list 300 specifies when the user is either receiving a call from Beyonce or calling Beyonce. The user in this case specified that it wants to display an inbound call from Beyonce as text on screen 28 (row 304, col. 301). If Beyonce called phone 10 and is speaking into her phone, controller 16 automatically converts Beyonce's spoken words via SRE 18 and displays the translated text on screen 28. Controller 16 may optionally create a chat room environment via CRE 24 to handle the texting between a user and Beyonce, even though Beyonce is speaking. The user's inputted text is automatically translated via TVE 22 and transmitted to Beyonce's phone. If Beyonce is texting to phone 10, controller 16 will optionally open a chat room with Beyonce via CRE 24 and will display her texts on screen 28. If the user is placing a call to Beyonce, contacts list 300 shows that the outbound call will be a voice call/communication (row 304, col. 302). Whether the user was speaking into the phone or inputting words via keypad 32, controller 16 will automatically transmit a voice signal to Beyonce. TVE 22 would automatically convert any entered text before the resulting voice signal was transmitted to Beyonce. It is also possible that the user can both talk and text, and the resulting voice signal would be combined by controller 16 before being transmitted to Beyonce.

In the third example, the user is either receiving an inbound call from Maria or calling Maria (row 305). When Maria calls the user, contacts list 300 specifies that the user wants to hear what Maria is either saying or texting (row 305, col. 301). When the user calls Maria, controller 16 will be automatically configured to transmit text to Maria regardless of whether the user of phone 10 is talking or texting (row 305, col. 302).

In the fourth example, the user is either receiving an inbound call from Britney or calling Britney (row 306). When Britney calls the user, controller 16 will be automatically configured so that the user will both hear and see what Britney is either saying or texting (row 306, col. 301). When the user calls Britney, controller 16 will automatically transmit a voice signal to Britney regardless of whether the user is talking, texting or doing both (row 306, col. 302).

In an alternative embodiment, the configuration information may not be included in the contacts table, but would be a general call setting that handles all inbound and outbound calls in the same way. In another alternative embodiment, the configuration setting would be a general call setting, where all inbound communications would be handled according to an inbound configuration setting, while all outbound communications would be handled according to an outbound configuration setting. These preempted configuration settings could be programmed, set, and changed by the user. The user could access the "default" inbound and outbound call settings through the menu system and change it via interaction with controller 16 via keypad 32 and/or buttons 36 or through SRE 18.

In the preferred embodiment of the present invention, if the call is in progress and the user wants to change whether the inbound call is heard or seen, the user can use three different methodologies. First, the user can speak a command (such as "Voice", "Text", "Both"). Second, the user could press one of the buttons 36 on phone 10 that is specifically designated to toggle between the three options. Third, the user could enter a specific sequence of numbers, letters, and/or symbols which would be interpreted by controller 16 for changing this setting. For example, after the user enters *11, controller 16 would interpret the entry to process the inbound communication or call as a voice signal that could be heard over speaker 26. A voice signal would be transmitted as-is to speaker 26, whereas controller 16 would convert text to a voice signal via TVE 22 so the resulting voice signal could be heard on speaker 26. If the user enters *22, controller 16 would configure phone 10 to display the inbound call as text on screen 28. Controller 16 would transmit text as-is to screen 28, whereas controller 16 utilizing SRE 18 would convert the inbound caller's speech to text that could be seen on screen 28. If the user enters *33, controller 16 would process the inbound call both to a voice signal that could be heard on speaker 26, and to text that could be seen on screen 28.

Figure 7:
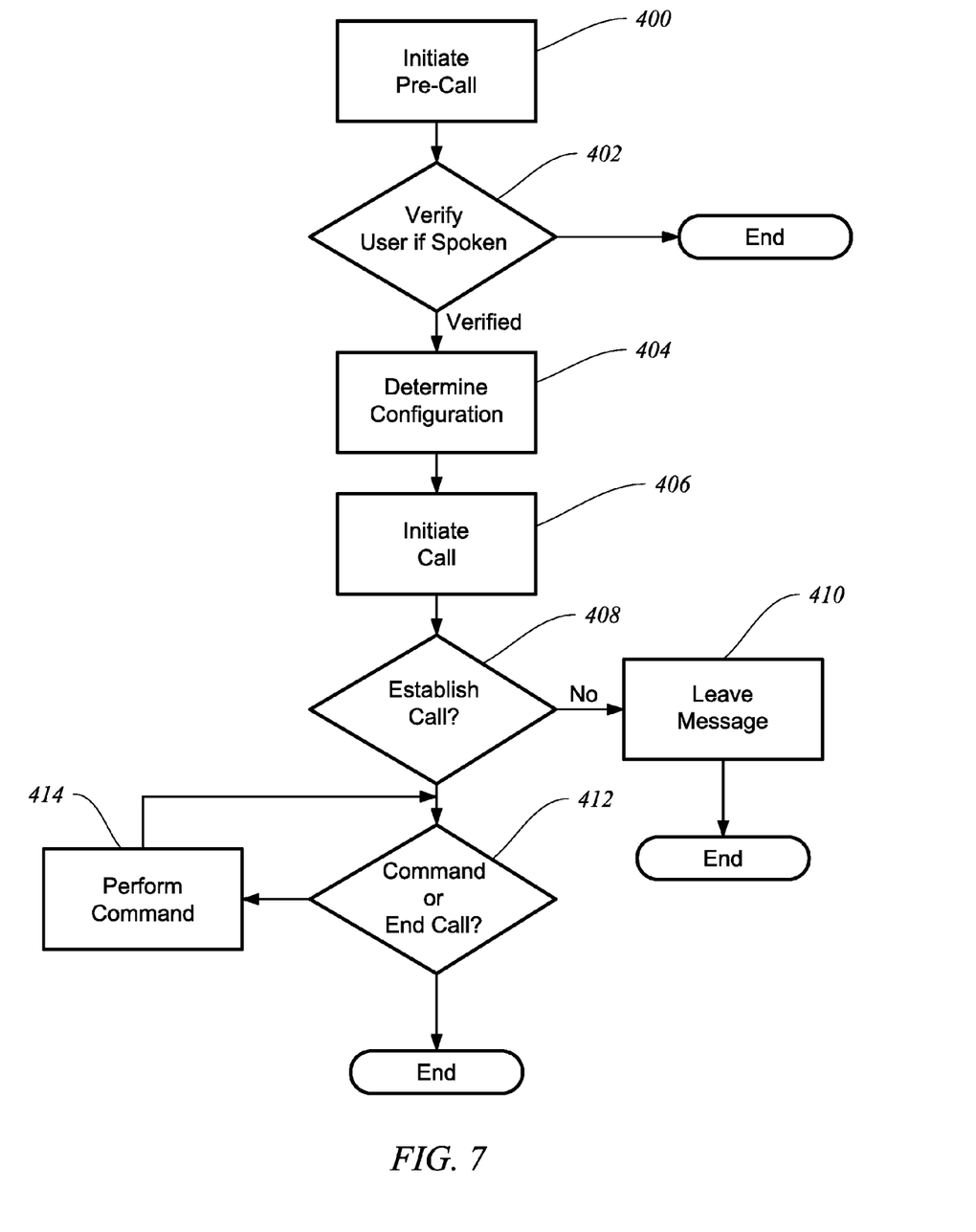
FIG. 7 shows a flowchart illustrating an outbound call method according to a preferred embodiment of the present invention.

FIG. 7 shows a flowchart of an outbound call method according to a preferred embodiment of the present invention. The method begins in step 400 where the pre-call setup is initiated by the user. The user can either enter a phone number via keypad 32, or the user may access the contacts list and scroll through the list to find who the user wants to call using buttons 36 and keypad 32. Alternatively, the user may speak a preselect or user-selectable command word such as "DIAL", "CALL" or "CONFERENCE" and the name(s) of the person(s) or place(s). If the user speaks a command and the name of the person or place who the user wants to call, controller 16 verifies the identity of the speaker in step 402. If controller 16 determines that the spoken word or words are not those of the user, the outbound call method ends. Otherwise, controller 16 determines in step 404 whether the configuration of the call will be transmitted as a voice communication or as text communication. In step 406, controller 16 initiates the call to the intended recipient(s) and waits in step 408 for a response to the call or the expiration of a predetermined time period. If the recipient(s) did not respond or the time period expired, the user can leave a message (if permitted by the recipient) in step 410, and then the call or communication session terminates. If the recipient responds to the user's call, the call is established and the call continues in step 412 until one of the parties terminates the call or the user speaks a command. If a command is spoken in step 412, the corresponding action is performed by controller 16 in step 414, and the method returns to step 412 to wait for an indication of call ending or for another spoken command. Once one of the callers terminates the call, the outbound method ends.

Although the description above focused on phones and methods, it should be apparent to one skilled in the art that the phone and methods of the present invention can be used for a variety of devices and communications means. Through the mobile phone and methods described above, the present invention can facilitate whether inbound calls are heard, displayed or both. The present invention utilizes a contacts list to determine whether an inbound call should received as-is or converted to a different format, and whether an outbound call should be transmitted as a voice signal or as text.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

What is claimed is:
1. A method for a phone comprising:
 receiving a first voice command from a user that applies a configuration to a phone for outputting an inbound call as one of a text or a voice call;
 applying the configuration to the phone;
 receiving the inbound call;

outputting the inbound call according to the configuration;

receiving a second voice command from a user, during the duration of the inbound call, that applies a reconfiguration to the phone for outputting an inbound call as the other of a text or a voice call;

modifying the output of the inbound call according to the reconfiguration.

* * * * *